United States Patent
Uchida

(10) Patent No.: US 6,901,627 B2
(45) Date of Patent: Jun. 7, 2005

(54) RESIN INNER MEMBER-PROVIDED GROMMET

(75) Inventor: Yoshimi Uchida, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 14 days.

(21) Appl. No.: 10/256,375

(22) Filed: Sep. 27, 2002

(65) Prior Publication Data

US 2003/0061680 A1 Apr. 3, 2003

(30) Foreign Application Priority Data

Oct. 1, 2001 (JP) ........................................ 2001-305282
Oct. 22, 2001 (JP) ........................................ 2001-323036

(51) Int. Cl.[7] ................................................. F16L 5/00
(52) U.S. Cl. .............................. 16/2.1; 16/2.2; 174/135
(58) Field of Search ........................ 16/2.1–2.5; 174/19, 174/21 R, 65 R, 135

(56) References Cited

U.S. PATENT DOCUMENTS

| | | | | |
|---|---|---|---|---|
| 2,663,895 A | * | 12/1953 | Petri ............................. | 16/2.1 |
| 3,001,007 A | * | 9/1961 | Klumpp, Jr. et al. .......... | 16/2.1 |
| 3,372,441 A | * | 3/1968 | Fisher ........................... | 16/2.1 |
| 4,131,379 A | * | 12/1978 | Gordy et al. .................. | 16/2.1 |
| 4,137,602 A | * | 2/1979 | Klumpp, Jr. ................... | 16/2.1 |
| 4,656,689 A | * | 4/1987 | Dennis .......................... | 16/2.2 |
| 4,675,937 A | * | 6/1987 | Mitomi ......................... | 16/2.1 |
| 5,537,714 A | * | 7/1996 | Lynch et al. .................. | 16/2.1 |
| 5,545,854 A | * | 8/1996 | Ishida ........................... | 16/2.2 |
| 5,774,934 A | * | 7/1998 | Fujita et al. ................... | 16/2.1 |
| 5,870,799 A | * | 2/1999 | Benda ........................... | 16/2.1 |
| 6,088,874 A | * | 7/2000 | Nakata et al. ................. | 16/2.1 |
| 6,133,529 A | * | 10/2000 | Gretz ............................ | 16/2.2 |
| 6,211,464 B1 | * | 4/2001 | Mochizuki et al. ........... | 16/2.1 |
| 6,341,405 B1 | * | 1/2002 | Uchida .......................... | 16/2.1 |

* cited by examiner

Primary Examiner—Daniel P. Stodola
Assistant Examiner—Christopher Boswell
(74) Attorney, Agent, or Firm—Harness, Dickey & Pierce, P.L.C.

(57) ABSTRACT

A locking claw (23a) to be locked to a through-hole (H) projects outwardly from a peripheral wall (21) of a resinous inner member (20). At least one pair of locking holes (24) is formed on a locking flange part (22) projecting from the peripheral wall (21). An annular concavity (12a) (13a), on which the locking flange part (22) fits, is formed on an inner peripheral surface of a large-diameter cylindrical part (12, 13). Locking projections (12a-1, 13a-1) project from a leading end of a side wall of the annular concavity (12a, 13a). The locking projections (12a-1, 13a-1) are inserted into and locked with the locking holes (24). Locking claws (123a–126a) project from the resinous inner member (120) and are locked to a through-hole (H1) of the body panel (P1). A pair of flexible locking pieces (123–126), to be locked to the body panel (P1), project from each of a shorter side and a longer side of an elliptic peripheral wall (121) of the resinous inner member (120) projecting from an open end of the large-diameter cylindrical part (112, 113). A leading end of the locking pieces (123–126) project outwardly from an intermediate position of an outer surface of the locking pieces (123–126). The locking pieces on the longer side are curved longitudinally to form a circular arc shape.

19 Claims, 10 Drawing Sheets

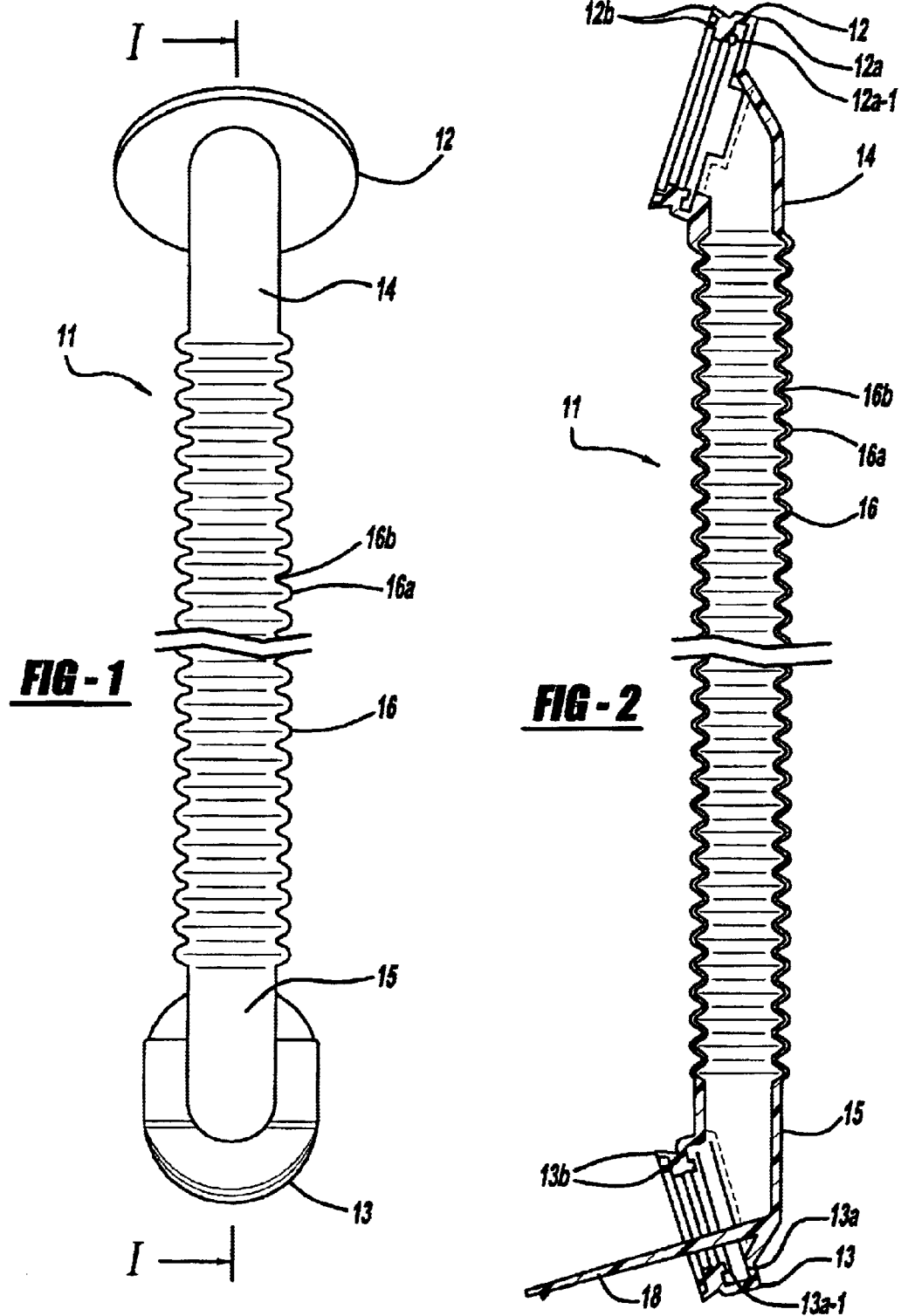

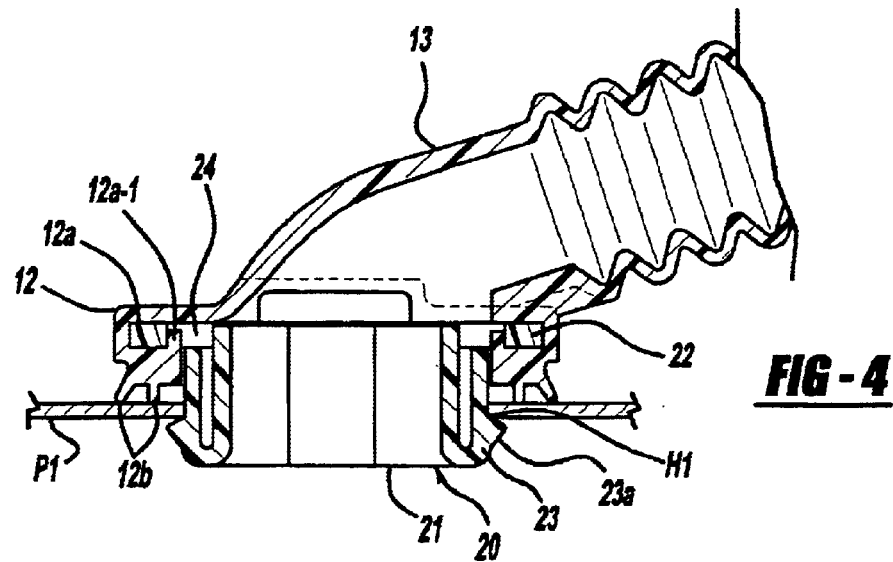
FIG - 4
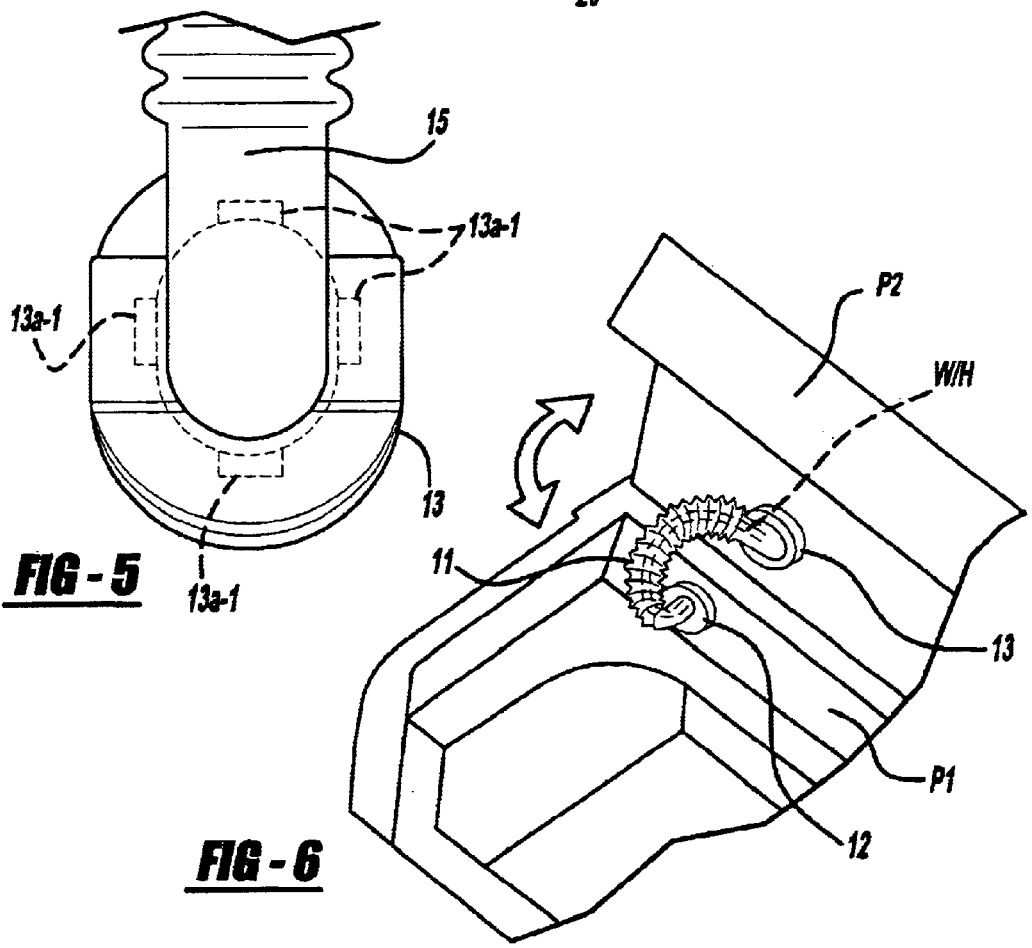
FIG - 5
FIG - 6

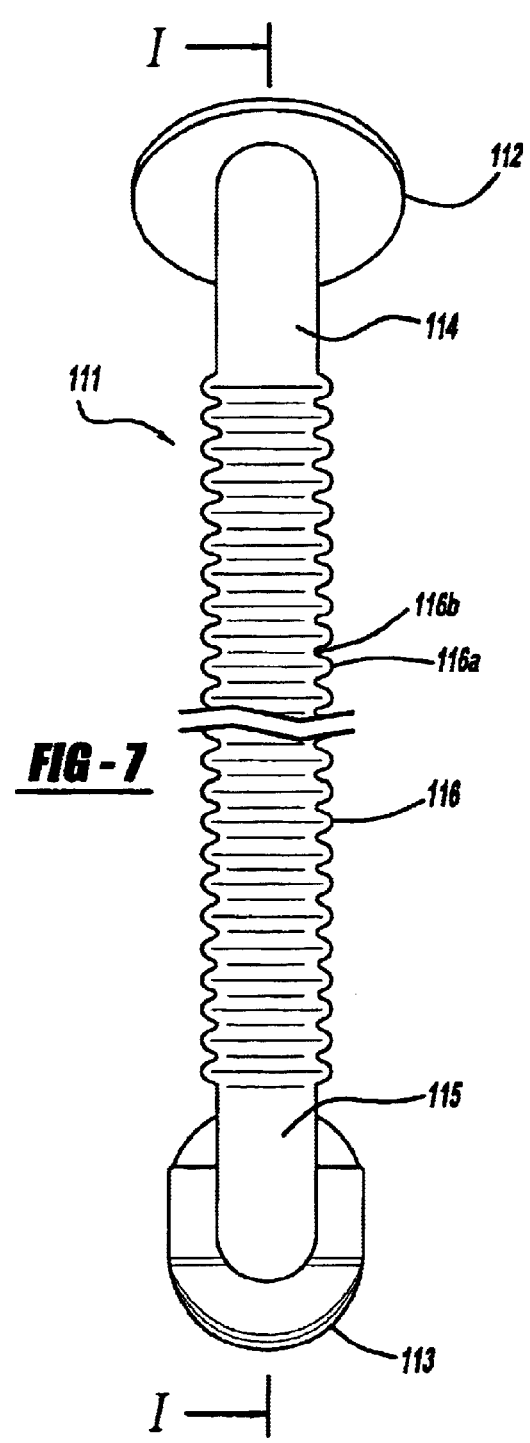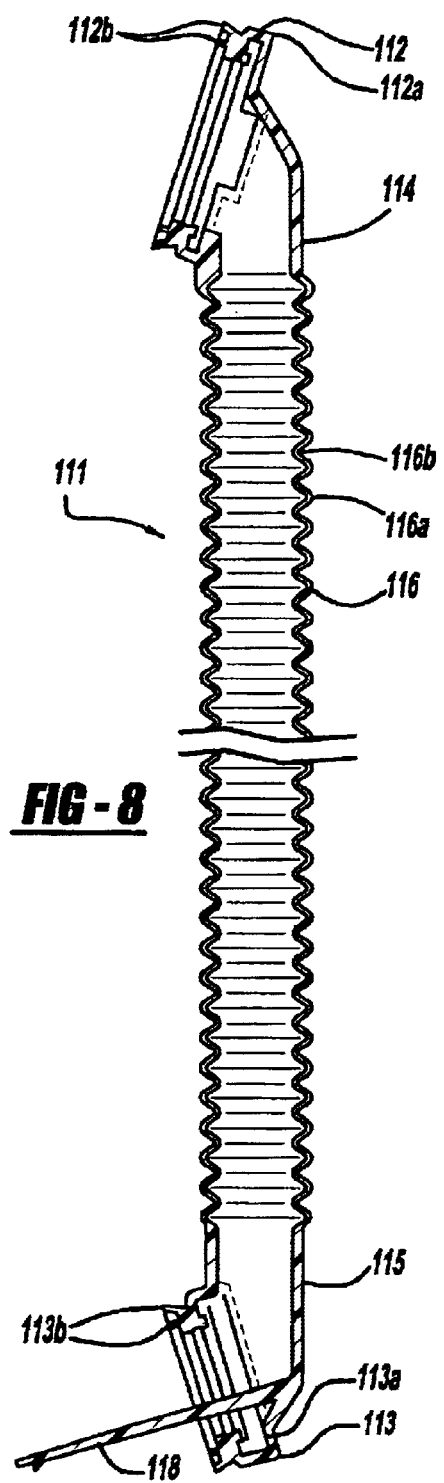
*FIG - 7*
*FIG - 8*

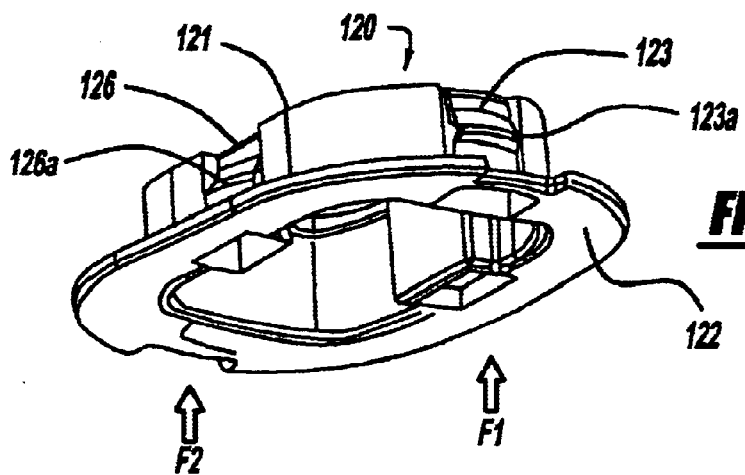
FIG - 13
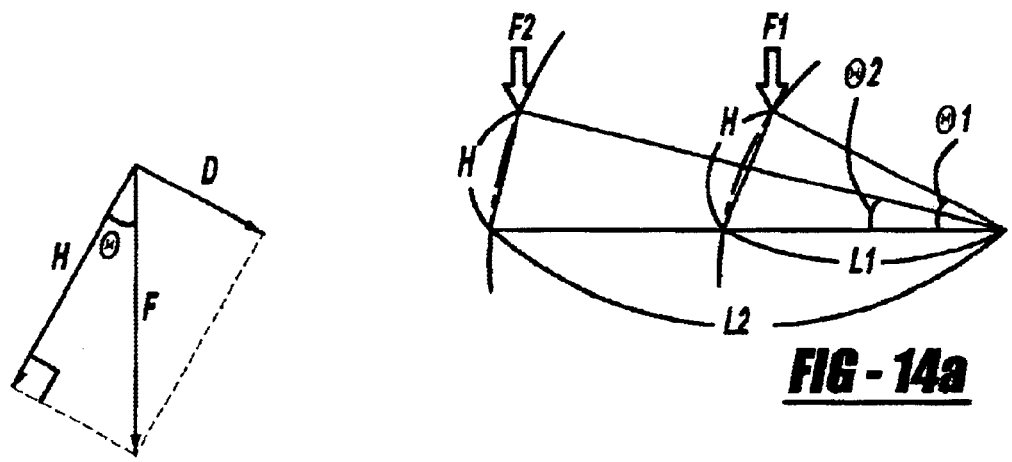
FIG - 14a
FIG - 14b
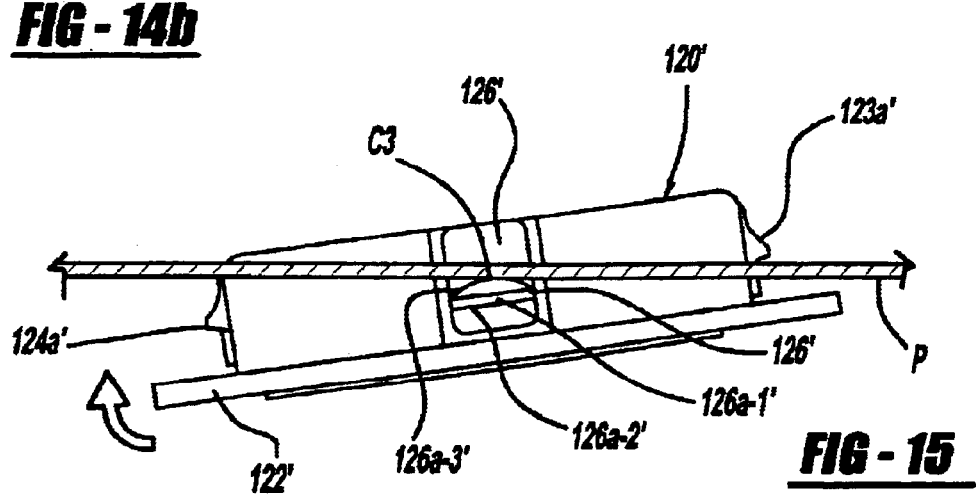
FIG - 15

RESIN INNER MEMBER-PROVIDED GROMMET

CROSS-REFERENCE TO RELATED APPLICATIONS

This application claims priority to Japanese Patent Application Nos. JP 2001-305282 and JP 2001-323036 filed Oct. 1, 2001 and Oct. 22, 2001, respectively, which applications are herein expressly incorporated by reference.

FIELD OF THE INVENTION

The present invention relates to a resinous inner member-provided grommet. More particularly, the present invention is intended to securely bring an open end of a large-diameter cylindrical part of the body of the grommet into close contact with a body panel of a vehicle. This improves the waterproof performance and dustproof performance of the grommet. Also, the resinous inner member-provided grommet can be inserted into a through-hole of a door panel with a small force to lock the resinous inner member-provided grommet into the through-hole.

BACKGROUND OF THE INVENTION

A wire harness to be wired on a vehicle body is inserted into a resinous inner member-provided grommet mounted on a through-hole of a body panel. A portion of the wire harness inserted into the resinous inner member-provided grommet is protected, waterproofed, and protected against penetration of dust. FIG. 16A is an example of a conventional resinous inner member-provided grommet 1.

The resinous inner member-provided grommet 1 has a resinous inner member 3 accommodated inside a large-diameter cylindrical part 4. The cylindrical part 4 is continuous with a leading end of a small-diameter cylindrical part 5 of the body 7 of the grommet 2.

A locking flange part 3a of the resinous inner member 4 is fitted on an annular concavity 4a formed on the inner peripheral surface of the large-diameter cylindrical part 4. The periphery of a through-hole H of a body panel P is locked between a sealing lip 4b projected from an open end of the large-diameter cylindrical part 4 and a locking claw 3b of the resinous inner member 4.

In a normal state shown in FIG. 16A, the sealing lip 4b projects from the open end of the large-diameter cylindrical part 4. The lip 4b is pressed against the periphery of the through-hole H of the body panel P. Therefore, the resinous inner member-provided grommet 1 is capable of preventing penetration of water and dust.

However, when a pulling force is exerted on the large-diameter cylindrical part 4 toward the small-diameter cylindrical part 5, the locking force on the annular concavity 4a of the large-diameter cylindrical part 4 to the locking flange part 3a of the resinous inner member 3 becomes weak. As a result, the large-diameter cylindrical part 4 shifts in the direction shown with the arrow of FIG. 16B.

In association with the shift of the large-diameter cylindrical part 4, the sealing lip 4b shifts upward separating from the body panel P. Consequently water and dust may penetrate into the body 2 from a space S generated between the sealing lip 4b and the body panel P.

FIG. 17 is an example of a conventional resinous inner member-provided grommet 106.

The resinous inner member-provided grommet 106 has a resinous inner member 101 accommodated inside a large-diameter cylindrical part 107a of the body 107 of the grommet 106. A locking flange part 105 is fitted on an annular concavity formed on the inner peripheral surface of the large-diameter cylindrical part 107a. The periphery of a through-hole H1 of a body panel P is locked between a sealing lip 107b, projecting from an open end of the large-diameter cylindrical part 107a, and locking claws 102a–104a of the resinous inner member 101.

More specifically, of locking pieces 102–104 projecting from the peripheral wall of the resinous inner member 101, initially, locking claw 102a of the locking piece 102 is locked to the through-hole H1 of the body panel P. Then the side of the locking piece 102 opposite to the locking claw 102a is pressed into the through-hole H1. Thereafter, a locking claw 103a of the locking piece 103 at the side opposite to the locking claw 102a is inserted into and locked in the through-hole H1. In this manner, the grommet 106 is installed on the body panel P. When the locking claw 102a is locked to the through-hole H1 of the body panel P during installation of the grommet 101 on the body panel P, the resinous inner member 101 may rotate a little in the direction shown with the circular arrow of FIG. 17.

In the case where the through-hole H1 of the body panel P is elliptical and the peripheral wall of the resinous inner member 101 is also elliptical, the locking claw 4a at the longer side of the resinous inner member 101, orthogonal to the circular arc-shaped locking pieces 102 and 103 at the shorter side, is straight at an outermost edge of the projected portion, as shown in FIG. 18. Thus when the resinous inner member 101 rotates, as shown in FIG. 19A, the locking claw 104a contacts the periphery of the through-hole H1 of the body panel P at a corner C1.

In the case where the locking claw 104a contacts the periphery of the through-hole H1 in this manner, the distance w is long between the periphery of the through-hole H1 and a root portion 104a-2, of the locking claw 104a, which is the final locking position. Thus, there is waste in a pressing amount.

Further since the locking claw 104a contacts the periphery of the through-hole H1 at the corner C1, the force-applied point of the pressing force applied to the locking piece 104 by the periphery of the through-hole H1 is the corner C1. Therefore, the force to flex the locking piece 104 may increase.

SUMMARY OF THE INVENTION

The present invention overcomes the above-described shortcomings of the prior art. Accordingly, it is an object of the present invention to increase a fitting force of a resinous inner member on a large-diameter cylindrical part of the body of a grommet. This brings a sealing lip, formed at an open end of the large-diameter cylindrical part, into close contact with a body panel, even when an external force is applied to the body of the grommet. Thus, the waterproof and dustproof performance is improved.

To achieve the object, a resinous inner member-provided grommet includes a body made of an elastic material. A large-diameter cylindrical part is disposed at a leading end of an electric wire insertion small-diameter cylindrical part. A resinous inner member is accommodated inside the large-diameter cylindrical part of the body. The wire harness passes through the resinous inner member-provided grommet which is installed on a body panel. A locking claw projects from the resinous inner member to a through-hole of the body panel to lock the member-provided grommet to the body panel. In this construction, a locking claw projects outward from a peripheral wall of the resinous inner member projecting from an opening formed at a leading end of the large-diameter cylindrical part. A locking flange part projects from the peripheral wall and is inserted into an annular concavity formed on the body of the grommet. This mounts the locking flange part on the annular concavity. At least one pair of locking holes is formed on the locking flange part. The locking holes are located at opposed positions. Locking projections, to be inserted into the locking holes, are formed at a leading end of a side wall of the annular concavity formed on the body of the grommet.

In the above-describe construction, the locking flange part of the resinous inner member is fitted on the annular concavity of the large-diameter cylindrical part. The locking projection of the annular concavity is inserted into the locking hole of the locking flange part and locked thereto. Thus, even if an external force is applied to the body of the grommet and the large-diameter cylindrical part is pulled toward the small-diameter cylindrical part, the body of the grommet is locked between the annular concavity and the locking flange part. The locking projection is caught by the locking hole. Accordingly, it is possible to prevent the large-diameter cylindrical part from separating from the resinous inner member fixed to the body panel by the locking claw.

Due to the increase in the locking force between the resinous inner member and the large-diameter cylindrical part, the open end of the large-diameter cylindrical part closely contacts the body panel. Thus, it is possible to improve waterproof and dustproof performance of the grommet.

At least one pair of the locking holes and at least one pair of the locking projections are formed at opposed positions, respectively. Thus, even though a pulling force is exerted on the grommet body in the direction in which locking holes and the locking projections are disposed, it is possible to reliably prevent the opposed surfaces of the large-diameter cylindrical part from shifting upward.

The locking hole formed on the locking flange part of the resinous inner member is located at a position confronting a projected portion of the locking claw. Further the locking hole is used as a cavity necessary for molding a material into the locking claw.

Molding a material into the resinous inner member can be easily accomplished by forming a cavity on a portion of the locking flange part located at a position confronting the locking claw. In the embodiment, because the cavity is utilized as the locking hole, it is unnecessary to form a locking hole separately from the cavity. Therefore it is possible to reduce the number of manufacturing stages. To form the locking claw, it is preferable to project the outer surface of the locking piece projecting from the outer surface of the peripheral wall by folding the outer surface in the shape of "U".

A peripheral wall of the resinous inner member is elliptic in section. The locking claw is formed at a center of each of four sides of the resinous inner member. A locking hole is formed on a portion of the locking flange part confronting the locking claw.

The locking projections are locked to the locking holes at four sides of the resinous inner member. Thus, even though a pulling force is exerted on the grommet body in various directions, it is possible to reliably lock the locking flange part to the annular concavity. This reliably prevents the open end of the large-diameter cylindrical part from shifting upward relative to the resinous inner member.

A bellow-shaped cylindrical part is provided between the large-diameter cylindrical parts locked to the through-hole of the body panel and to the door panel respectively. Thus when the door panel on which one of the large-diameter cylindrical parts has been installed is opened and closed, the bellow-shaped cylindrical part flexibly expands and contracts, following an opening/closing operation.

It is an additional object of the present invention to provide a resinous inner member-provided grommet that can be inserted and locked into a through-hole of a door panel with a small force.

To achieve the object, a resinous inner member-provided grommet includes a body made of rubber or elastomer. A large-diameter cylindrical part is disposed at a leading end of an electric wire insertion small-diameter cylindrical part. A resinous inner member is accommodated inside the large-diameter cylindrical part of the body. The resinous inner member-provided grommet receives a wire harness and is installed on a body panel. Locking claws project from the resinous inner member to a through-hole of the body panel to lock the grommet to the body panel. In this construction, a pair of flexible locking pieces, to be locked to the body panel, projects from each shorter side and longer side of an elliptic peripheral wall of the resinous inner member projected from an open end of the large-diameter cylindrical part. A leading end of the locking pieces which projects outwardly from an intermediate position of an outer surface of the locking pieces and disposed at the longer side, are curved longitudinally to form a circular arc shape. A locking flange part projects from a lower end of the peripheral wall. The locking flange part is inserted into an annular concavity formed on the body to install the resinous inner member on the body.

Each of the locking pieces project from one end of the folded peripheral wall. This provides the locking pieces with flexibility. A straight outer surface of a leading side of the locking claw projects from each pair of locking pieces disposed at the longer side of the elliptic peripheral wall.

The resinous inner member-provided grommet is installed on the through-hole of the body panel by two procedures or patterns. In the first pattern, one of the locking claws projecting from one of the longer sides of the peripheral wall of the resinous inner member is locked to the through-hole of the door panel. Next, the other longer side is pressed into the through-hole. Accordingly, the locking claw projecting from the other longer side is locked to the though-hole. In the second pattern, one of the locking claws projecting from one of the shorter sides of the peripheral wall of the resinous inner member is locked to the through-hole of the door panel. Next, the other shorter side is pressed into the through-hole. Accordingly, the locking claw projecting from the other shorter side is locked to the though-hole.

In the first pattern, during pressing of the second longer side into the through-hole, after locking the first longer side into the through hole, the first longer side acts as a fulcrum and the second longer side acts as a force-applying point. In this case, the distance between the fulcrum and the force-applying point is long. Thus a large insertion force is required.

In the second pattern, during pressing of the second shorter side into the through-hole, after locking the first shorter side into the through hole, the first shorter side acts as a fulcrum and the second shorter side is considered as the force-applying point. In this case, the distance between the fulcrum and the force-applying point is short. Thus, a smaller insertion force is required in the second pattern than in the first. Accordingly, it is preferable to use the second pattern to lock the resinous inner member-provided grommet to the through-hole of the body panel.

When the locking claw at one of the shorter sides is pressed and locked into the through-hole, with the other of the shorter sides locked to the through-hole of the body panel (as described above in the second pattern), the locking claw projecting from the longer side is inserted and locked into the through-hole. In this case, when the resinous inner member rotates in the direction transverse to the insertion direction, the longer side of the resinous inner member is not parallel with the periphery of the through-hole. However, since the end of the locking claw projecting from the longer side is circular arc-shaped, the periphery of the through-hole contacts the locking claw at approximately in its center.

Therefore unlike the conventional straight locking claw which project from the longer side, there is no waste of pressing force during pressing the periphery of the through-hole. Further, since the force-applying point is disposed at the center of the locking claw, the locking claw is easily flexed and thus the insertion force can be reduced.

Even though the rotational amount of the resinous inner member changes a little, the periphery of the through-hole contacts the locking claw at approximately its center. Thus, it is possible to eliminate variation in the insertion force.

If the locking claw is straight and if the longer side of the resinous inner member is parallel with the periphery of the through-hole, the locking claw is pressed into the through-hole. The periphery of the through-hole makes a line contact with the locking claw. However, according to the present invention, the locking claw is circular arc-shaped. Thus the periphery of the through-hole and the locking claw are pressed against each other, with both in a point contact with each other. Thus in view of the friction resistance, the insertion force can be reduced. Accordingly, the locking claw projecting from the shorter side of the resinous inner member may be circular arc-shaped to reduce the insertion force.

The resinous inner member is approximately elliptic in the embodiment. However the resinous inner member may be rectangular, circular or the like, provided that a pair of the confronting locking claws projecting from the shorter side is orthogonal to a pair of the confronting locking claws projecting from the longer side.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a front view showing the body of a resinous inner member-provided grommet according to an embodiment of the present invention.

FIG. 2 is a sectional view taken along a line I—I of FIG. 1.

FIG. 4 is a sectional view showing main portions of the grommet.

FIG. 5 is an enlarged view showing main portions of the grommet.

FIG. 6 is a perspective view showing a grommet-disposed portion.

FIG. 7 is a front view showing the body of a resinous inner member-provided grommet according to an embodiment of the present invention.

FIG. 8 is a sectional view taken along a line I—I of FIG. 7.

FIG. 13 is a perspective view of the resinous inner member seen from below.

FIGS. 14A and 14B are concept views for comparing insertion forces with each other.

FIG. 15 is a side view showing a resinous inner member of a second embodiment.

DETAILED DESCRIPTION OF THE PREFERRED EMBODIMENTS

Figure 3A:
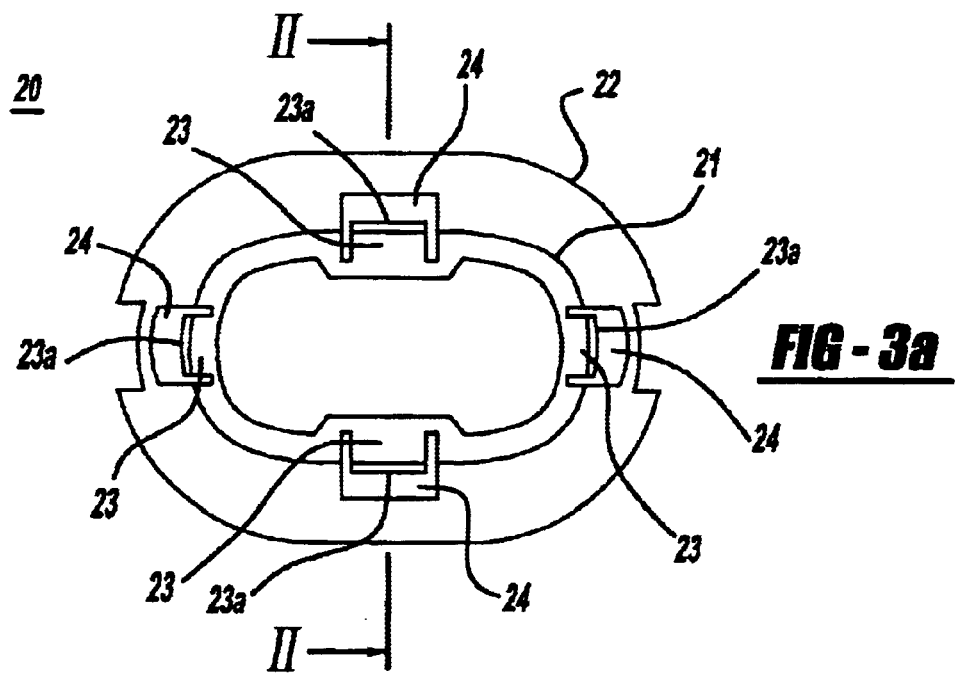
FIG. 3A is a plan view showing a resinous inner member.

The following description of the preferred embodiment(s) is merely exemplary in nature and is in no way intended to limit the invention, its application, or uses.

The grommet according to the invention is installed between a body panel P and a door panel P2 as shown in FIG. 6. A wire harness is inserted into the grommet. The grommet has a body 11 and a resinous inner member 20, installed on the body 11.

The body 11 has a bellow-shaped cylindrical part 16. The bellow-shaped cylindrical part 16 has alternating mountain portions 16a and valley portions 16b. Small-diameter cylindrical parts 14 and 15 are continuous with respective ends of the bellow-shaped cylindrical part 16. Large-diameter cylindrical parts 12 and 13 are continuous with the small-diameter cylindrical parts 14 and 15, respectively. The body 11 is made of rubber or elastomers integrally molded to shape.

The large-diameter cylindrical parts 12 and 13 have annular concavities 12a and 13a for locking the resinous inner member 20 to the body 11. Locking projections 12a-1 and 13a-1 are formed at an open side of the large-diameter cylindrical parts 12 and 13 of the annular concavities 12a and 13a, respectively. Sealing lips 12b and 13b project from an open end of the large-diameter cylindrical parts 12 and 13, respectively.

A wire harness-fixing tape-wound tongue piece 18 projects from an inner surface of the large-diameter cylindrical part 13. The tongue piece 18 is exposed to the outside through an opening of the large-diameter cylindrical part 13.

Figure 3B:
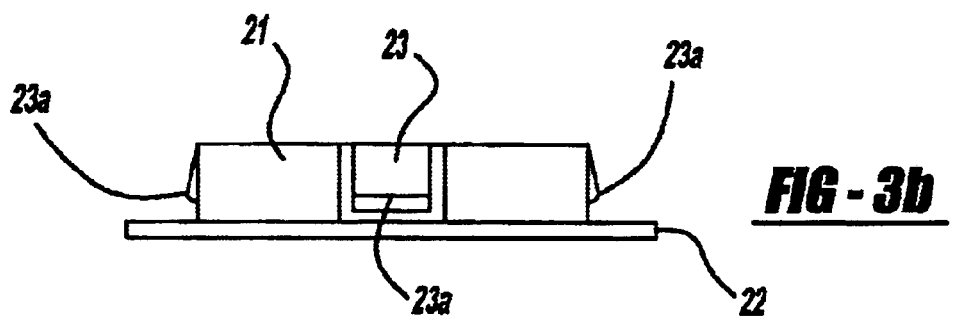
FIG. 3B is a side view showing the resinous inner member.
Figure 3C:
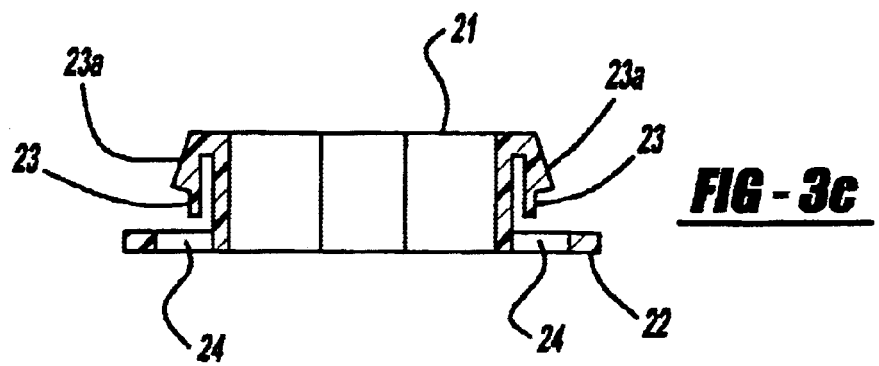
FIG. 3C is a sectional view taken along a line II—II of FIG. 3A, showing the resinous inner member.

As shown in FIGS. 3 and 4, the resinous inner member 20 has an approximately elliptic peripheral wall 21. A locking flange part 22 projects vertically from the lower end of the peripheral wall 21. A locking piece 23 is folded in a U-shaped at approximately the center of each of four sides of the peripheral wall 21. A locking claw 23a projects from the outer surface of the locking piece 23. A locking hole 24 is formed on a portion of the locking flange part 22 disposed below the locking piece 23.

The grommet is locked to the body panel P1 and the door panel P2. Resinous inner members 20 are installed on each of the large-diameter cylindrical parts 12 and 13.

Of the large-diameter cylindrical parts 12 and 13, only the large-diameter cylindrical part 12 is described below. As shown in FIG. 4, the locking flange part 22 of the resinous inner member 20 is fitted on the annular concavity 12a of the large-diameter cylindrical part 12. The locking projection 12a-1 is inserted into the locking hole 24 and locked in the locking hole 24.

The leading end of the resinous inner member 20 is inserted into a through-hole H1 of body panel P1. As a result, the locking claw 23a is flexed inward. The periphery of the through-hole H1 rides over the locking claw 23a. Consequently, the body panel P1 is sandwiched, under pressure, between a sealing lip 12b and the locking claw 23a.

Similarly to the large-diameter cylindrical part 12, the large-diameter cylindrical part 13 is inserted into and locked in the through-hole of the door panel P2. A locking projection 13a-1 (shown in FIGS. 2 and 5) is formed on a side wall of the annular concavity 13a. The locking projection 13a-1 is disposed at an open side of the large-diameter cylindrical part 13. The projection 13a-1 is locked to the locking hole 24 of the resinous inner member 20.

In the above-describe construction, the locking flange part 22 of the resinous inner member 20 is fitted on the annular concavities 12a and 13a of the large-diameter cylindrical parts 12 and 13. The locking projections 12a-1 and 13a-1 of the annular concavities 12a and 13a are inserted into and locked on the locking hole 24 of the locking flange part 22. Therefore, even though the large-diameter cylindrical parts 12 and 13 are pulled toward the small-diameter cylindrical parts 14 and 15, the locking projections 12a-1 and 13a-1 are caught by the locking hole 24. Thus, it is possible to prevent the large-diameter cylindrical parts 12 and 13 from separating from the resinous inner member 20 fixed to the body panel P1 by the locking claw 23a.

The sealing lips 12b and 13b, disposed at the open end of the large-diameter cylindrical parts 12 and 13 respectively, closely contact the body panels P1 and P2, respectively. The contact improves waterproof and dustproof performance.

The locking piece 23 is folded in a U-shape. The locking pieces 23 projects from the outer surface of the peripheral wall 21. To mold a material into the resinous inner member 20, a cavity is formed on a portion of the locking flange part 22 disposed below the locking piece 23. In this embodiment, because the cavity is utilized as the locking hole 24, it is unnecessary to form a locking hole separate from the cavity. Therefore, it is possible to reduce the number of manufacturing stages. Needless to say, the locking hole 24 may be formed on a portion of the locking flange part 22 that is not disposed below the locking piece 23.

Further in the embodiment, the locking hole 24 and the locking projections 12a-1 and 13a-1 are formed on the four sides of the resinous inner member 20 and the large-diameter cylindrical parts 12 and 13, respectively. Thus, even though a pulling force acts on the body of the grommet in various directions, it is possible to reliably prevent the sealing lips 12b and 13b of the large-diameter cylindrical parts 12 and 13 from shifting upward.

Further the bellow-shaped cylindrical part 16 is provided between the large-diameter cylindrical parts 12 and 13. Thus when the door panel on which the large-diameter cylindrical part 13 has been installed is opened and closed, the bellow-shaped cylindrical part 16 flexibly expands and contracts following an opening/closing operation.

In the embodiment, the grommet is installed between the body panel and the door panel. However the mode of using the grommet is not limited to the above, so long as the resinous inner member is used by fitting it in the body of the grommet.

As apparent from the foregoing description, according to the present invention, even though the large-diameter cylindrical part is pulled toward the small-diameter cylindrical part, the locking projection formed on the side wall of the annular concavity of the large-diameter cylindrical part is inserted into and locked on the locking hole formed on the locking flange part of the resinous inner member. Thus, it is possible to prevent the large-diameter cylindrical part from separating from the resinous inner member. Accordingly, the open end of the large-diameter cylindrical part closely contacts the body panel. Thus, it is possible to improve waterproof and dustproof performance of the grommet.

The locking projections are locked to the locking holes at four sides of the resinous inner member. Thus, even though a pulling force is exerted on the grommet body in various directions, it is possible to reliably lock the locking flange part to the annular concavity. This reliably prevents the large-diameter cylindrical part from shifting upward relative to the resinous inner member.

The locking hole is formed on a portion of the locking flange part that confronts the locking claw of the peripheral wall of the resinous inner member. Thus, it is possible to utilize the cavity formed at a position that confronts the locking piece to mold the material into the locking claw. Therefore it is possible to reduce the number of manufacturing stages.

The grommet of a first embodiment is installed between a body panel P and a door panel P2 as shown in FIG. 6. A wire harness is inserted into the grommet. The grommet of the first embodiment has a body 111 and a resinous inner member 120 installed on the body 111.

As shown in FIGS. 7 and 8, the body 111 has bellow-shaped cylindrical part 116 having mountain portions 116a and valley portions 116b alternating with each other. Small-diameter cylindrical parts 114 and continuous with the ends of the below-shaped cylindrical part 116. Large diameter cylindrical parts 112 and 113 are continuous with the small-diameter cylindrical parts 114 and 115, respectively. The body 11 is made of rubber or elastomer integrally molded.

The large-diameter cylindrical parts 112 and 113 have annular concavities 112a and 113a to lock the resinous inner member 120 to the body 111. Sealing lips 112b and 113a project from an open end of the large-diameter cylindrical parts 112 and 113, respectively. A wire harness-fixing tape-wound tongue piece 118 projects from an inner surface of the large-diameter cylindrical part 113. The piece 118 is exposed to the outside through the opening of the large-diameter cylindrical part 113.

As shown in FIGS. 9 and 10, the resinous inner member 120 has an approximately elliptical peripheral wall 121. A locking flange part 122 project transversely from the lower end of the peripheral wall 121. Locking pieces 123–126 are folded in a U-shape at approximately the center of each of four sides of the peripheral wall 121. Locking claws 123a–126a project from the outer surface of the locking pieces 123–126, respectively. The locking claws 125a and 126a, at the longer sides of the peripheral wall 121, project in the shape of a circular arc. In the first embodiment, the locking claws 123a–126a all have a circular arc-shaped.

The grommet is locked to the body panel P1 and the door panel P2 with the resinous inner member 120 installed on each of the large-diameter cylindrical parts 112 and 113.

Of the large-diameter cylindrical parts 112 and 113, only the large-diameter cylindrical part 112 is described below. As shown in FIG. 10, the locking flange part 122 of the resinous inner member 120 is fitted on the annular concavity 112a of the large-diameter cylindrical part 112.

Figure 10A:
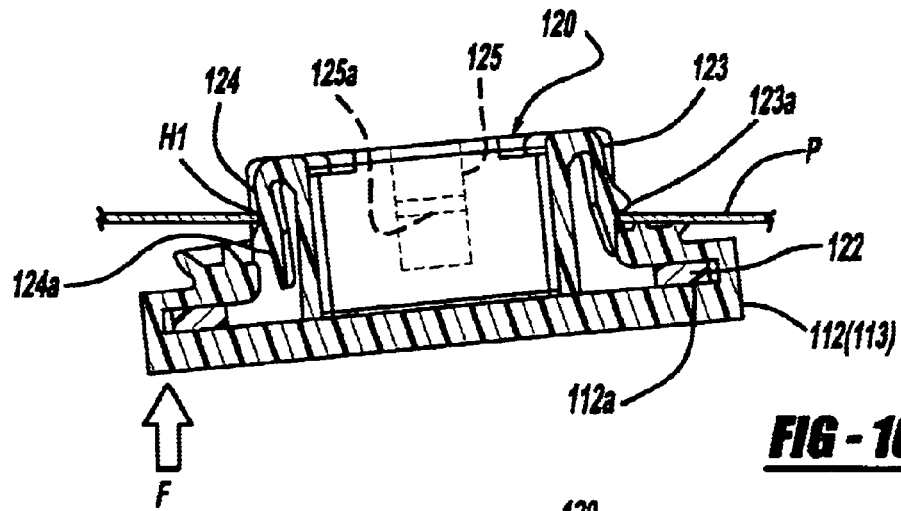
FIGS. 10A, 10B, and 10C are sectional views showing a grommet-installing procedure.
Figure 10B:
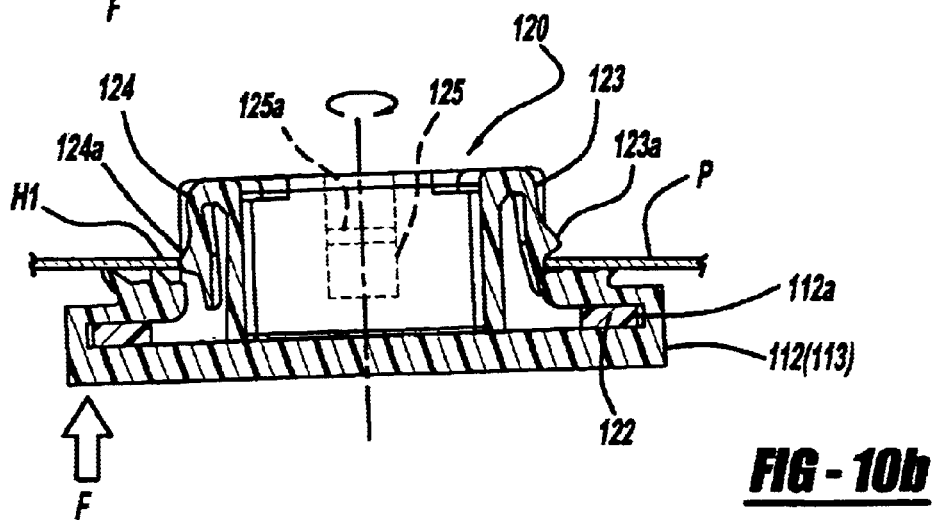
Figure 10C:
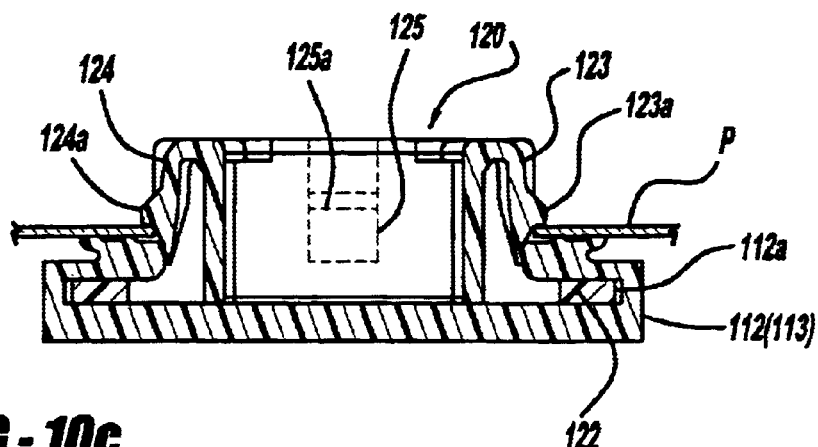
Figure 11:
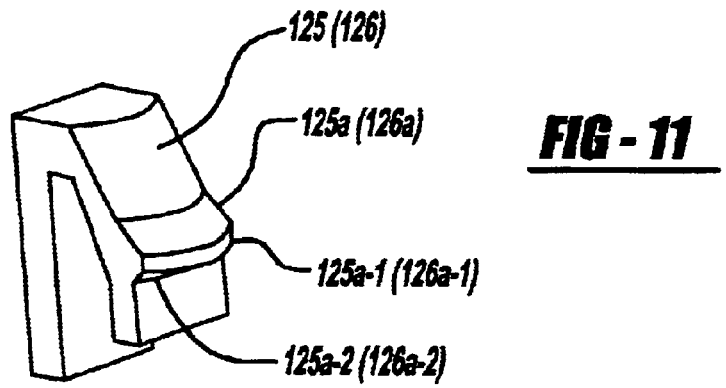
FIG. 11 is an enlarged view showing main portions of the resinous inner member.

Thereafter as shown in FIG. 10A, the leading end of the resinous inner member 120 is inserted into a through-hole H1 of the body panel P1. The locking claw 123a, projecting from one of the two shorter sides of the peripheral wall 121, is locked to the periphery of the through-hole H1. Thereafter as shown in FIG. 10B, the other shorter side of the peripheral wall 121 is pressed into the through-hole H1 by exerting a force F on the resinous inner member 120. The periphery of the through-hole H1 flexes the locking piece 124 inward. Consequently the periphery of the through-hole H1 rides over the locking claw 124a and also locking claws 125a and 126a of the locking pieces 125 and 126, both along the longer side of the peripheral wall 121. As a result, as shown in FIG. 10C, the locking claws 124a, 125a, and 126a are locked to the periphery of the through-hole H1. Consequently the body panel P1 is sandwiched between the sealing lip 112b and the locking claws 123a–126a.

Figure 12A:
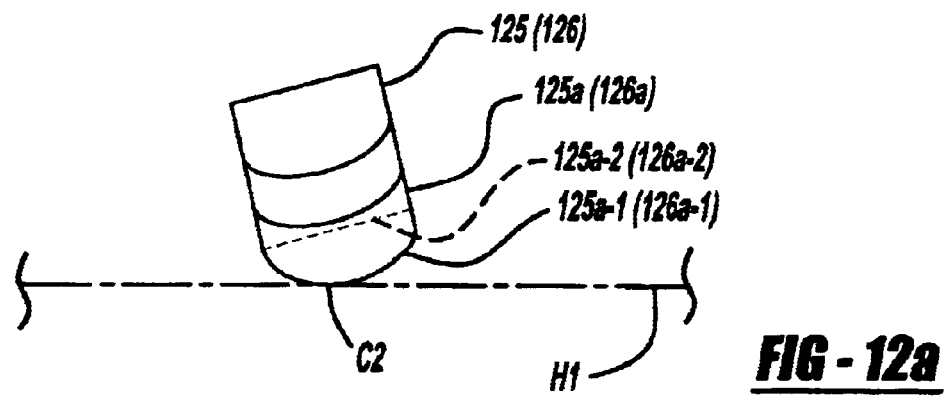
FIG. 12A is a plan view showing an unlocked state of a locking claw.
Figure 12B:
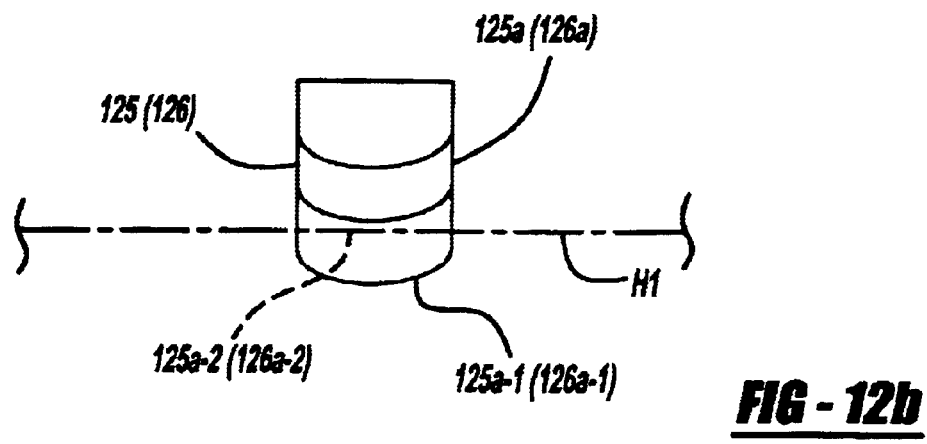
FIG. 12B is a plan view showing a locked state of the locking claw.
Figure 16A:
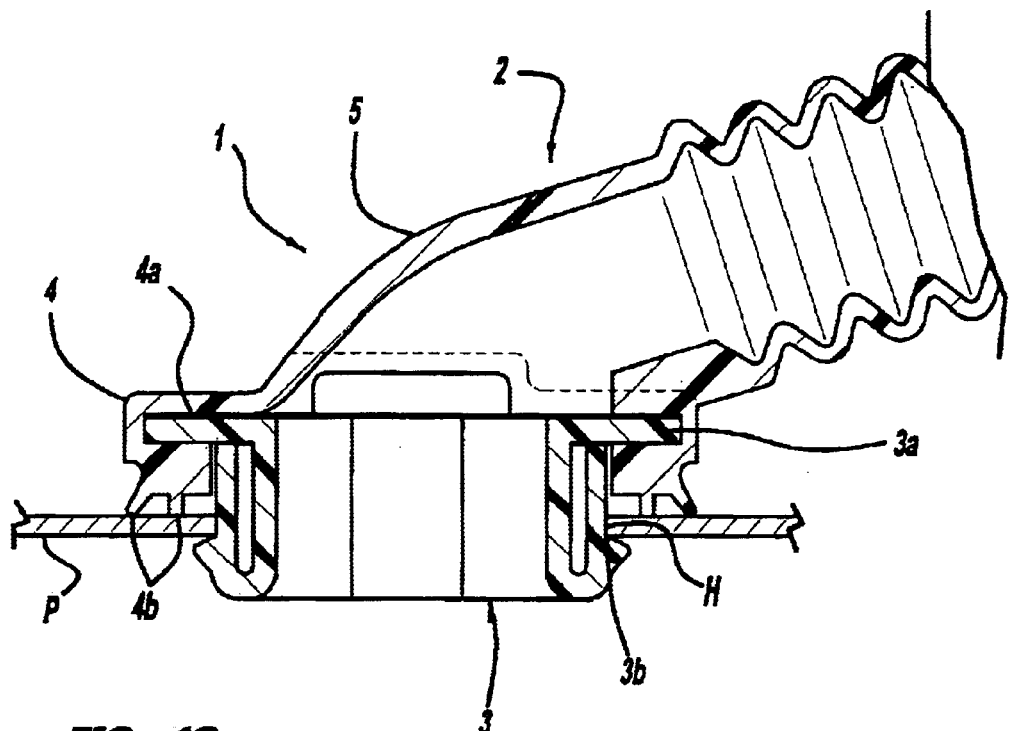
FIG. 16A is a sectional view showing main portions of a conventional grommet.
Figure 16B:
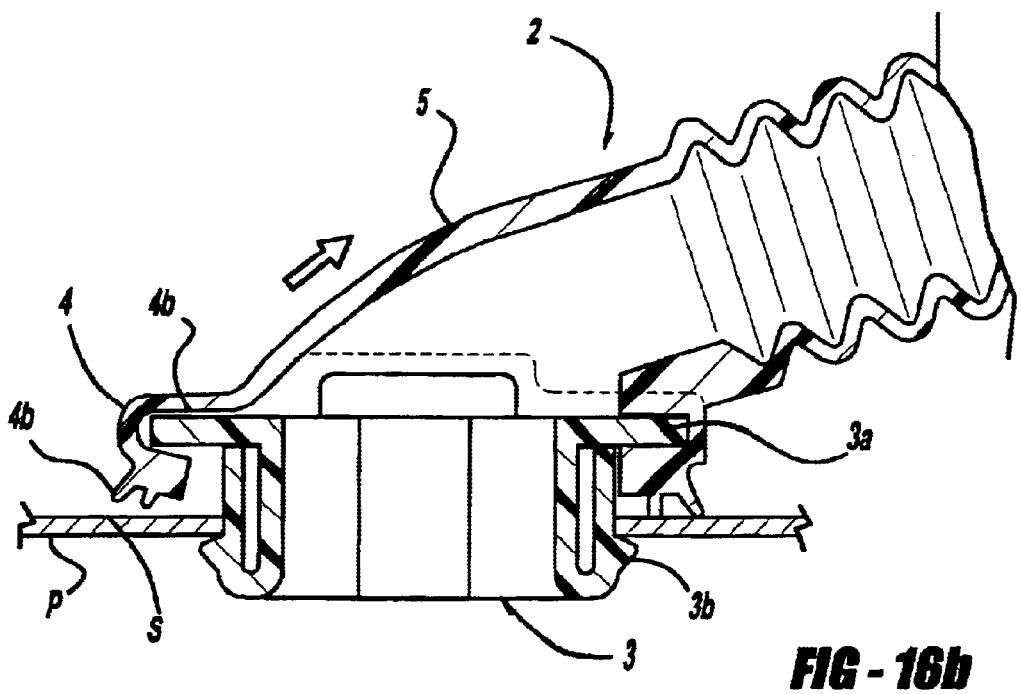
FIG. 16B is a sectional view like FIG. 16A with grommet lifting away from the flange.
Figure 17:
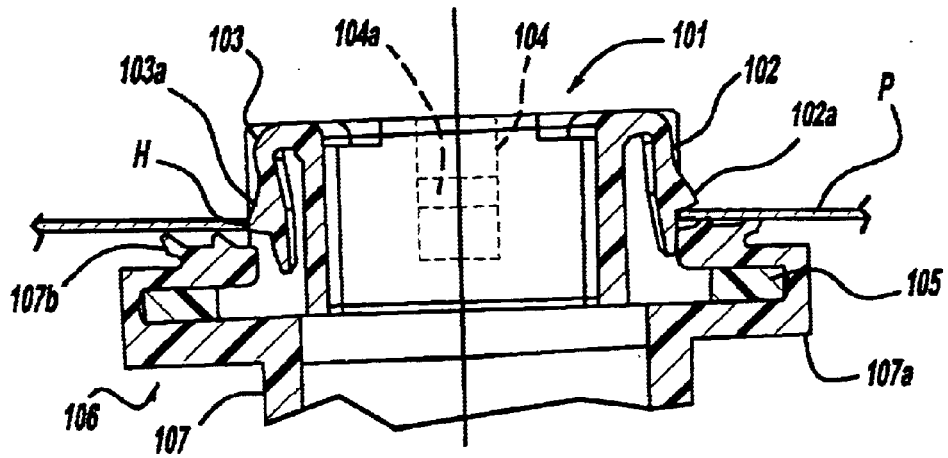
FIG. 17 is a sectional view showing main parts of a conventional grommet.
Figure 18:
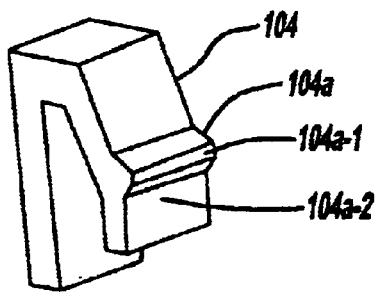
FIG. 18 is an enlarged view showing main portions of a conventional resinous inner member.
Figure 19A:
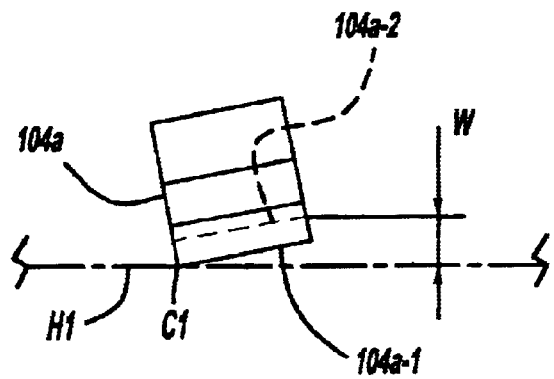
FIG. 19A is a plan view showing an unlocked state of a conventional locking claw.
Figure 19B:
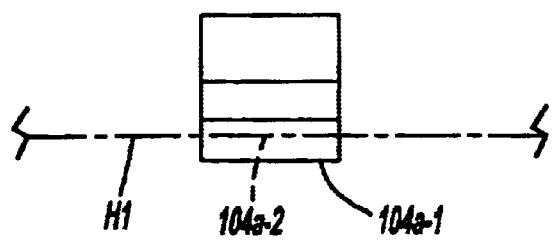
FIG. 19B is a plan view showing a locked state of the conventional locking claw.

When the resinous inner member 120 rotates during insertion in the direction shown by the circular arrow in FIGS. 10B and 12A, the locking pieces 125 and 126 projecting from the longer sides of the peripheral wall 121 are not parallel with the periphery of the through-hole H1. However, since the locking claws 125a and 126a have a circular arc-shaped, the periphery of the through-hole H1 contacts the locking claws 125a and 126a at a center C2 of leading ends 125a-1 and 126a-1, respectively. When the resinous inner member 120 is further pressed into the through-hole H1, the periphery of the through-hole H1 rides over the locking claws 125a and 126a locking straight root portions 125a-2 and 126a-2.

Since the periphery of the through-hole H1 contacts the locking claws 125a and 126a at the center C2 of the leading ends 125a-1 and 126a-1 respectively, there is no waste of pressing force required to press the root portions 125a-2 and 126a-2 into the periphery of the through-hole H1. This is unlike conventional straight locking claw 104a on the longer side of the peripheral wall of the resinous inner member 101. Further, because the force-applying point is disposed at the center of each of the locking claws 125a and 126a, the locking pieces 125 and 126 are easily flexed and thus the insertion force F is reduced.

Even though the rotational amount of the resinous inner member 120 changes a little, the periphery of the through-hole H1 contacts each of the locking claws 125a and 126a at approximately their center C2. Thus it is possible to eliminate variation in the insertion force F.

Further the locking claws 125a and 126a are circular arc-shaped. Thus the periphery of the through-hole H1 and each of the locking claws 125a and 126a are pressed against each other, with both in a point contact with each other. Thus, in view of the friction resistance, the insertion force F can be reduced. Furthermore since the root portions 125a-2 and 126a-2 of the locking claws 125a and 126a are straight, the periphery of the through-hole H1 can be reliably held when the locking claws 125a and 126a are finally locked to the through-hole H1 of the body panel P.

In the embodiment, the grommet is installed between the body panel and the door panel. However the mode of using the grommet is not limited to the above, so long as the resinous inner member is used by fitting it in the body of the grommet. Description is made on the reason after the locking claw 123 at the one shorter side of the peripheral wall 121 of the resinous inner member 120 is locked to the through-hole H1. The locking claw 124 at the other shorter side of the peripheral wall 121 is locked to the through-hole H1.

With reference to FIG. 13, the following two patterns are conceivable. In a first pattern, the locking claw 126a, projecting from the one longer side of the peripheral wall 121 of the resinous inner member 120, is locked to the through-hole H1 of the door panel P1. The confronting longer side is pressed into the through-hole H1 with a force F1. In a second pattern, the locking claw 123a, projecting from the one shorter side of the peripheral wall 121, is locked to the through-hole H1 of the door panel P1. The confronting shorter side is pressed into the through-hole H1 with a force F2.

Figure 9A:
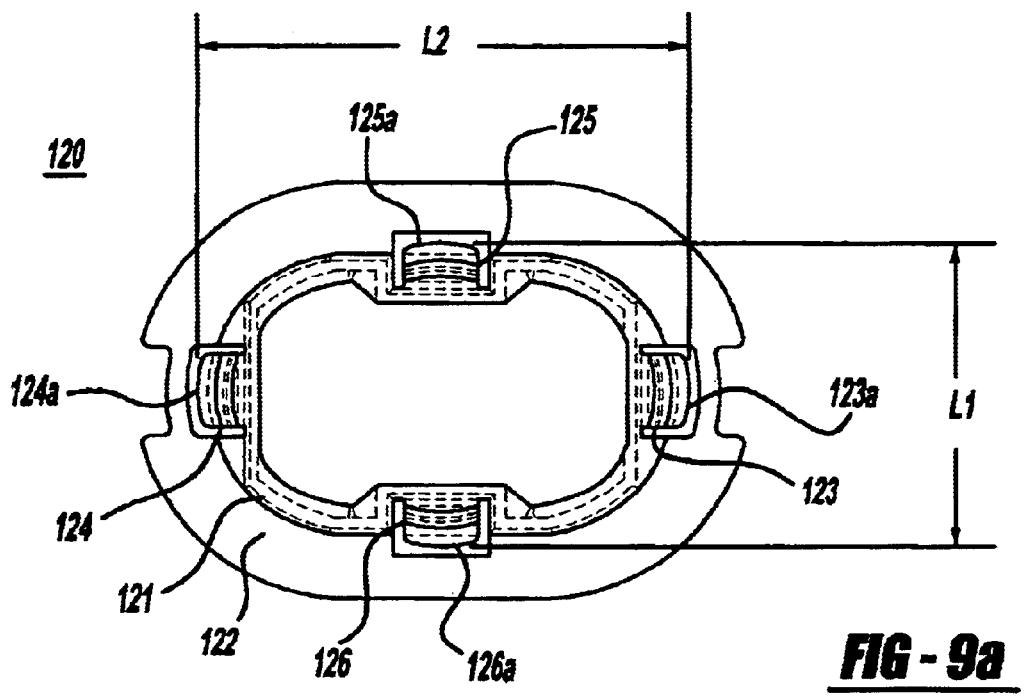
FIG. 9A is a plan view showing a resinous inner member.
Figure 9B:
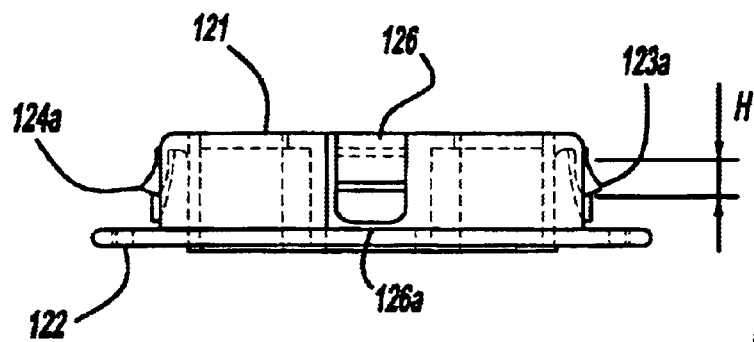
FIG. 9B is a front view showing the resinous inner member.
Figure 9C:
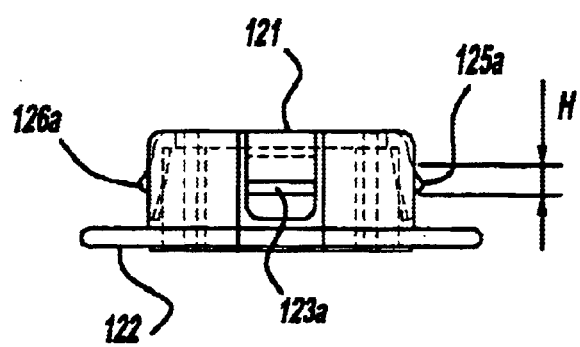
FIG. 9C is a side view showing the resinous inner member.

As shown in FIGS. 9A–9C, the distance between the locking pieces 125 and 126 of the resinous inner member 120 is L1. The distance between the locking pieces 123 and 124 is L2 with (L1<L2). A projected width of each of the locking claws 123a–126a is H. The insertion forces F1 and F2 are expressed dynamically in an illustration shown in FIG. 14A.

The distance between the force-applying point and the fulcrum 123 in the second pattern is longer than the distance between the force-applying point and the fulcrum 126 in the first pattern. Thus, the following relationship exist between a pressing angle θ1 in the first pattern and a pressing angle θ2 in the second pattern:

θ1>θ2.

The insertion force is resolved into H in the pressing direction of the locking claws 124a and 125a and an escape load D, as shown in FIG. 14B. From F=H/cos θ, the larger cos θ, the smaller the insertion force F. That is, the smaller θ, the smaller the insertion force F. From the above, of the pressing angles θ1 and θ2 similar to θ, the insertion force can be reduced by installing the resinous inner member 120 on the wall 121 in the insertion procedure of the second pattern constituting θ2. Accordingly, the insertion force can be effectively reduced by forming the locking claws 125 and 126 at the longer side of the resinous inner member 120 in the shape of a circular arc and installing the grommet on the through-hole of the body panel in the second pattern.

The second embodiment is different from the first embodiment in that a circular arc-shaped insertion-side root portion 126a-3' of a locking claw 126' projects from a longer-side locking piece 126' of a resinous inner member 120'.

That is, similarly to the first embodiment, a leading end 126-1' of the locking claw 126' is circular arc-shaped. A root portion 126a-2' is straight. The insertion-side root portion 126a-3' that initially contacts the periphery of a through-hole H1, when the grommet is inserted, is circular arc-shaped.

In this construction, when the resinous inner member 120' is inserted into the through-hole H of the body panel P, the resinous inner member 120' is pressed into the through-hole H in the direction shown with the circular arrow shown in FIG. 15. Thus, even though the resinous inner member 120' inclines, the periphery of the through-hole H always contacts approximately the center of the insertion-side root portion 126a-3'. Therefore there is no variations in the insertion force. The through-hole H and the locking claw 126' make a point contact in an early time in the insertion operation. Thus it is possible to reduce the insertion force.

Only the locking piece 126', projecting from one of the two longer sides, is shown in FIG. 15. Needless to say, the locking pieces 126' that project from the opposed sides of the two longer sides have a similar construction.

The other constructions of the second embodiment are similar to those of the first embodiment. Thus description thereof is omitted herein.

As apparent from the foregoing description, according to the present invention, the resinous inner member rotates in the direction transverse to the insertion direction during pressing of the locking claw at one of the shorter sides to lock it into the through-hole. The other of the shorter sides locks into the through-hole of the body panel. The longer side of the resinous inner member is not parallel with the periphery of the through-hole. However, in the present invention, since the locking claw projecting from the longer side is circular arc-shaped. The periphery of the through-hole contacts the locking claw at approximately its center.

Therefore there is no waste of pressing force during pressing the periphery of the through-hole. Further because the force-applying point is disposed at the center of the locking claw, the locking claw is easily flexed and thus the insertion force is reduced.

Even though the rotational amount of the resinous inner member changes a little, the periphery of the through-hole contacts the locking claw at approximately its center. Thus it is possible to eliminate variation in the insertion force.

Further the locking claw is circular arc-shaped. Thus the periphery of the through-hole and the locking claw always have a point contact. Thus in view of the friction resistance, the insertion force is reduced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A resinous inner member-provided grommet comprising:
    a body made of an elastic material having a large-diameter cylindrical part disposed at a leading end of an electric wire insertion small-diameter cylindrical part; and
    a resinous inner member accommodated inside said large-diameter cylindrical part of said body,
    said resinous inner member-provided grommet receiving a wire harness and to be installed on a body panel by locking a locking claw projecting from said resinous inner member to a through-hole of the body panel,
    said locking claw projecting outwardly from a peripheral wall of said resinous inner member projected from an opening formed at a leading end of said large-diameter cylindrical part;
    a locking flange part projecting from said peripheral wall and inserted into an annular concavity formed on said body of said grommet to mount said locking flange part on said annular concavity;
    at least one pair of locking holes formed on said locking flange part, said locking holes located at opposed positions; and
    locking projections for inserting into said locking holes formed at a leading end of a side wall of said annular concavity formed on said body of said grommet.

2. A resinous inner member-provided grommet according to claim 1, wherein said locking hole formed on said locking flange part of said resinous inner member is located at a position confronting a projecting portion of said locking claw and said locking hole is used as a cavity necessary for molding material into said locking claw.

3. A resinous inner member provided grommet according to claim 2, wherein a peripheral wall of said resinous inner member is elliptic in section, said locking claw formed at a center of each of four sides of said resinous inner member, and a locking hole is formed on a portion of said locking flange part confronting said locking claw.

4. A resinous inner member-provided grommet according to claim 1, wherein a peripheral wall of said resinous inner member is elliptic in section, said locking claw formed at a center of each of four sides of said resinous inner member, and a locking hole is formed on a portion of said locking flange part confronting said locking claw.

5. A resinous inner member-provided grommet comprising:
    a body having a large-diameter cylindrical part disposed at a leading end of an electric wire insertion small-diameter cylindrical part;
    a resinous inner member accommodated inside said large-diameter cylindrical part of said body;
    said resinous inner member-provided grommet receiving a wire harness and to be installed on a body panel by locking claws projecting from said resinous inner member to a through-hole of said body panel;
    a pair of flexible locking pieces to be locked to said body panel, each projecting from a shorter side of an elliptical peripheral wall of said resinous inner member projecting from an open end of said large-diameter cylindrical part;
    a leading end of said locking pieces projected outward from an intermediate position of an outer surface of said locking pieces are curved longitudinally to form a circular arc shape; and
    a locking flange part projecting from a lower end of said peripheral wall and inserted into an annular concavity formed on said body to install said resinous inner member on said body.

6. The resinous inner member-provided grommet according to claim 5, wherein each of said locking pieces projecting from one end of a folded portion of said peripheral wall to make said locking piece flexible, and a straight outer surface of a leading side of said locking claw projecting from each of a pair of said locking pieces of said elliptic peripheral wall.

7. The resinous inner member-provided grommet according to claim 6, wherein said locking claw being disposed at a longer side of said elliptical peripheral wall.

8. The resinous inner member-provided grommet according to claim 5, wherein a point contact exists between the locking claw and the through hole.

9. The resinous inner member-provided grommet according to claim 5, wherein the through hole contacts the locking claw at its center.

10. The resinous inner member-provided grommet according to claim 5, wherein a pair of flexible locking pieces each project from a longer side of said elliptical peripheral wall.

11. The resinous inner member-provided grommet according to claim 10, wherein said leading end of said locking pieces project outwardly from an intermediate position of an outer surface of said locking pieces disposed at said longer side are curved longitudinally to form a circular arc shape.

12. A resinous inner member-provided grommet comprising:

a body made of an elastic material having a large-diameter cylindrical part disposed at a leading end of an electric wire insertion small-diameter cylindrical part; and a resinous inner member accommodated inside said large-diameter cylindrical part of said body, said resinous inner member-provided grommet receiving a wire harness and to be installed on a body panel by locking a locking claw projecting from said resinous inner member to a through-hole of the body panel, a pair of flexible locking pieces to be locked to said body panel, each projecting from a shorter side of an elliptical peripheral wall of said resinous inner member projecting from an open end of said large-diameter cylindrical part;

a leading end of said locking pieces projected outward from an intermediate position of an outer surface of said locking pieces are curved longitudinally to form a circular arc shape; and a locking flange part projecting from said peripheral wall and inserted into an annular concavity formed on said body of said grommet to mount said locking flange part on said annular concavity;

at least one pair of locking holes formed on said locking flange part, said locking holes located at opposed positions; and locking projections for inserting into said locking holes formed at a leading end of a side wall of said annular concavity formed on said body of said grommet.

13. A resinous inner member-provided grommet according to claim 12, wherein said locking hole formed on said locking flange part of said resinous inner member is located at a position confronting a projecting portion of said locking claw and said locking hole is used as a cavity necessary for molding material into said locking claw.

14. The resinous inner member-provided grommet according to claim 12, wherein each of said locking pieces projecting from one end of a folded portion of said peripheral wall to make said locking piece flexible, and a straight outer surface of a leading side of said locking claw projecting from each of a pair of said locking pieces of said elliptic peripheral wall.

15. The resinous inner member-provided grommet according to claim 14, wherein said locking claw being disposed at a longer side of said elliptical peripheral wall.

16. The resinous inner member-provided grommet according to claim 12, wherein a point contact exists between the locking claw and the through hole.

17. The resinous inner member-provided grommet according to claim 12, wherein the through hole contacts the locking claw at its center.

18. The resinous inner member-provided grommet according to claim 12, wherein a pair of flexible locking pieces each project from a longer side of said elliptical peripheral wall.

19. The resinous inner member-provided grommet according to claim 18, wherein a leading end of said locking pieces project outwardly from an intermediate position of an outer surface of said locking pieces disposed at said longer side are curved longitudinally to form a circular arc shape.

* * * * *